United States Patent

[11] 3,596,972

| [72] | Inventor | Stuart D. Pool<br>Wheaton, Ill. |
|---|---|---|
| [21] | Appl. No. | 854,499 |
| [22] | Filed | Sept. 2, 1969 |
| [45] | Patented | Aug. 3, 1971 |
| [73] | Assignee | International Harvester Company<br>Chicago, Ill. |

[54] TREE CLAMP STRUCTURE
13 Claims, 2 Drawing Figs.

[52] U.S. Cl. .................................................. 294/103,
56/328
[51] Int. Cl. .................................................. B25b 5/02
[50] Field of Search .......................................... 294/88,
103; 56/328 TS; 100/211

[56] References Cited
UNITED STATES PATENTS

| 3,335,556 | 8/1967 | Edgemond | 56/328 TS |
| 3,479,806 | 11/1969 | Pool et al. | 56/328 TS |
| 3,494,654 | 2/1970 | Gould et al. | 294/103 |

Primary Examiner—Evon C. Blunk
Assistant Examiner—Johnny D. Cherry
Attorney—Noel G. Artman ABSTRACT: A tree clamp structure mounted on a boom adapted to be reciprocated to dislodge fruit from a tree. The clamp structure includes fixed and movable jaws having flexible tree-engaging pods thereon. Each pod includes a flexible cap mounted on a jaw to define an airtight chamber containing silicone putty, tire carcass discs, and air to provide a tree-gripping structure for reciprocating a tree without relative movement therebetween.

PATENTED AUG 3 1971

3,596,972

INVENTOR
STUART D. POOL

BY Neal C. Johnson
ATT'Y.

TREE CLAMP STRUCTURE

BACKGROUND OF THE INVENTION

1. Field of the Invention

The invention relates generally to fruit-harvesting devices and more particularly to an improved clamp structure adapted to grip a tree limb and mounted upon a reciprocable boom for dislodging fruit from the tree.

2. Description of Prior Art

In a tree-shaking operation for dislodging fruit, it is common practice to employ a reciprocable boom having a clamp structure for gripping the tree limbs to be shaken. A fundamental problem is that the clamp structure may damage the bark on the tree limb due to rapid relative movement of the clamp structure and the limb being shaken.

An attempt to solve the problem is revealed in U.S. Pat. No. 3,335,556 wherein a clamp structure includes a pair of flexible gripper heads adapted to grip a tree limb therebetween. Each gripper head includes a flexible cap mounted on a jaw to define a chamber. The chamber is completely filled with a substantially incompressible and flowable material so as to act as a substantially rigid member to transmit the vibration of the boom to the limb after clamping is effected.

While the above approach to the problem is desirable to eliminate relative movement between the clamp and the limb, the effect of the "rigid member" may create problems when the arrangement is subjected to long and sustained use. With the chamber completely filled with the substantially incompressible material, it has been found that the cap member may break back upon itself when the structure is tightly clamped to the limb. Portions of the periphery of the cap tend to fold or crease along sharp lines which eventually results in a tear or break along those lines.

The jaws of the typical tree clamp structure are commonly actuated between gripping and released positions by hydraulic means. Over sustained periods of use the hydraulic system is subject to wear and resulting slight leakage of hydraulic fluid. When rigid gripping pads are used (that is, pads completely filled with a flowable and incompressible material), the grip of the clamp structure on the limb tends to loosen during reciprocation due to the fluid leakage in the hydraulic system. In an attempt to solve this problem accumulators have been incorporated into the hydraulic circuit to "cushion" the relative movement between the clamp structure and the associated boom. Of course, the accumulators increase the cost and complexity of the device.

A further problem associated with tree clamp structures is that the tree limbs may be disposed at a wide variety of angles relative to the boom and clamp structure. In addition, the limbs may be of irregular shape and, of course, of a variety of thicknesses. These variable factors present a situation wherein the manner of engagement of the clamp structure onto a tree limb is different in practically every separate clamping operation. The problem then is to create a clamp structure which is capable of effecting a firm grip on tree limbs regardless of the above-noted variable factors. In an attempt to provide clamp structures with the requisite versatility, it is common practice to pivotally or swively mount the gripping members on the clamp structure. The swivel joints or pivot connections increase the complexity and cost of the clamp structure.

SUMMARY

The invention provides an improved clamp structure for gripping a tree limb during a tree-shaking operation. The clamp structure includes a fixed jaw and a movable jaw each having a pair of tree-engaging flexible pods mounted thereon for firmly gripping a tree limb therebetween. Each of the pods defines an airtight chamber which contains at least one disc-shaped member, a flowable and substantially incompressible material, and entrapped air. The pod construction enables the clamp structure to be tightly gripped on a tree limb so that undesirable relative movement between the clamp structure and the limb during reciprocation of the clamp structure will be eliminated or reduced to a negligible minimum. At the same time, the pod construction accommodates the deformation without breakage of the flexible cap member defining the chamber. The air within the chamber accommodates volume changes without adding to the deformation strain of the cap member. Moreover, the clamp structure maintains a firm grip on the tree limb during reciprocation without requiring that an accumulator be included in the hydraulic system which actuates the clamp structure. The gripping pods of the clamp structure are constructed to flex or roll laterally in order to more readily accommodate tree limbs having irregular shapes, varying thicknesses, and which are disposed at a wide variety of angles relative to the clamp structure. Accordingly, the pods do not have to be mounted by swivel joints or pivot connections.

The objects of the invention may be briefly summarized as follows: to provide an improved clamp structure for maintaining a firm grip on a tree limb during shaking without damaging the tree bark; to provide an improved clamp structure for shaking a tree limb in a manner wherein relative movement of the clamp structure and the limb is reduced or substantially eliminated; to provide an improved clamp structure capable of firmly gripping tree limbs of irregular shapes, a wide variety of sizes, and which are disposed at a variety of angles relative to the clamp structure; and to provide an improved gripping pod structure which accommodates deformation during gripping without failure of the flexible cap member or increasing the strain of deformation.

DESCRIPTION OF THE PREFERRED EMBODIMENT

Figure 1:
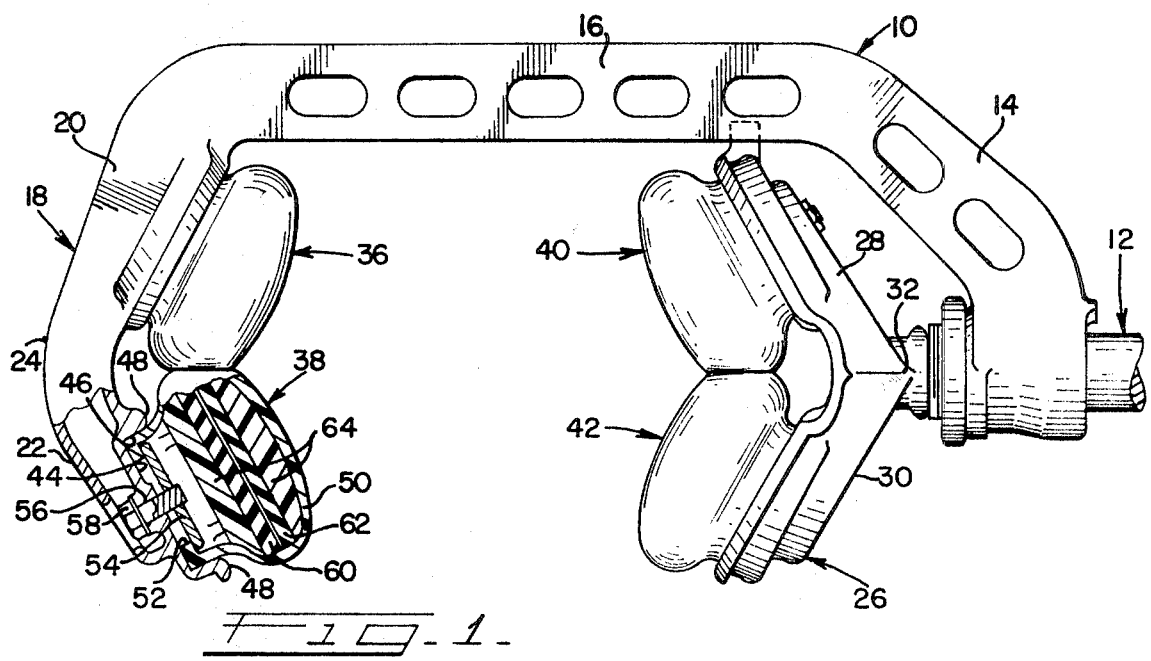
FIG. 1 is a fragmentary side elevation view of the clamp structure of the invention and further illustrating a tree-gripping pod in cross section; and, FIG. 2 is a fragmentary side elevation view of the clamp structure of FIG. 1 illustrating the disposition of the structure when tightly clamped on a tree limb.

The clamp assembly of the invention includes an arm 10 fixed to the outer end of a boom 12. In practice, the boom 12 is adapted to be swingably mounted on a suitable support and rapidly reciprocated by a suitable shaker mechanism. The arm 10 includes a laterally extending inclined section 14 and a longitudinally extending section 16. Formed integrally with the end of section 16 is a jaw 18 comprising sections 20 and 22 angularly disposed relative to each other and being joined at an apex 24 disposed in alignment with the longitudinal axis of the boom 12.

The clamp assembly includes a jaw 26 which is movable toward and away from the fixed jaw 18. The movable jaw 26 includes a pair of sections 28 and 30 angularly disposed relative to each other and being joined at an apex 32 disposed in alignment with the longitudinal axis of the boom 12. The jaw 26 is mounted on the end of a rod 34 which is coaxially and extensibly mounted from the boom 12. In practice, the rod 34 constitutes the rod of a hydraulic piston-cylinder unit in the boom 12 for moving the jaw 26.

Tree-engaging pods 36, 38, 40, and 42 are mounted on the sections 20, 22, 28, and 30 respectively of the fixed and movable jaws. As shown in FIG. 1, the jaw sections 20 and 30 are arranged in opposed substantially parallel relation to each other, as are the jaw sections 22 and 28. Accordingly, the pods are disposed to grip a tree limb in a manner which tends to center the limb along the longitudinal axis of the boom.

The structural details of each of the pods is shown in FIG. 1 with reference to the pod 38. The jaw section 22 includes a circular seat 44 which is defined by an annular rim 46. The rim 46 includes an edge 48 which is rounded in cross section as shown. A cup-shaped cap 50 is adapted for mounting on the jaw section 22 to define a chamber therewith. The cap 50 is constructed of flexible slightly stretchable material which may be urethane for example, an elastomer cast into the shape illustrated. The base portion of cap 50 includes an annular rib or flange 52 mounted in the circular seat 44. The rib 52 is engaged by a circular plate 54 to which a bolt 56 is welded. The bolt 56 extends axially of the cap outwardly through the seat 44 and is held in place by a nut 58. The cap 50 is thus securely held in place to define an airtight chamber in conjunction with the plate 54.

The cap 50 is shaped so as to increase in diameter in an axial direction away from the rim 46 (as measured along the longitudinal axis of the bolt 56) and then gradually decrease to form a convex end surface for engaging the tree limb. More particularly, the maximum diameter of the cap 50 is substantially greater than the diameter of the base portion of the cap received within the rim 46. The maximum diameter is also greater than the diameter of the rim 46 and is spaced axially outwardly from the rim 46 prior to being deformed during clamping. By virtue of this construction, the maximum diameter portion of the cap 50 can flex or "roll" laterally relative to the seat 44 during clamping to accommodate tree limbs of irregular shape and various sizes. The capability of flexing and rolling also permits the clamp to be clamped onto tree limbs at a wide variety of angles of the boom relative to the limbs. By virtue of the maximum diameter of the cap being greater than the diameter of the rim, the cap is engageable with the rounded in cross section rim during clamping so that bending and creasing along sharp lines is prevented.

In accordance with a feature of the invention a pair of circular discs 60 and 62, of tire carcass material for example, are floatably disposed within the cap 50 across the maximum interior diameter portion thereof. The diameter of the discs 60 and 62 is preferably just slightly less than the maximum interior diameter of the cap 50. In practice, each disc 60 and 62 includes a radial cut (not shown) enabling each disc to be partially folded for insertion within the cap 50 wherein each disc then assumes its substantially planar shape as shown.

Disposed within the chamber defined by the cap 50 and plate 54 is a silicone putty 64, which together with the discs 60 and 62 occupies between 74 percent and 88 percent of the total volume of the chamber. The remainder of the volume of the chamber is occupied by air trapped therein. The silicone putty 64 is a non-Newtonian fluid known as a dilatant fluid or an inverted pseudoplastic. The apparent viscosity of this material increases instantaneously with increasing rate of shear.

As shown in FIG. 1 the air occupies the space between the silicone putty and the plate 54. The pod is shown in this manner to illustrate the volume relationships between the air and the discs and putty. In actuality, the putty is flowable and thus acted upon by gravity to fill the lowermost portions of the chamber.

The ratio of the volume of air to that of the discs and putty has been found to be important. If the chamber contains less than about 12 percent by volume of air, deformation of the flexible cap during clamping will produce stretching of the cap to maintain the fixed volume of the chamber. On the other hand, if the air volume exceeds about 25 percent of the chamber volume, then the stress in the cap increases substantially due to the greater amount of deformation of the cap.

Figure 2:
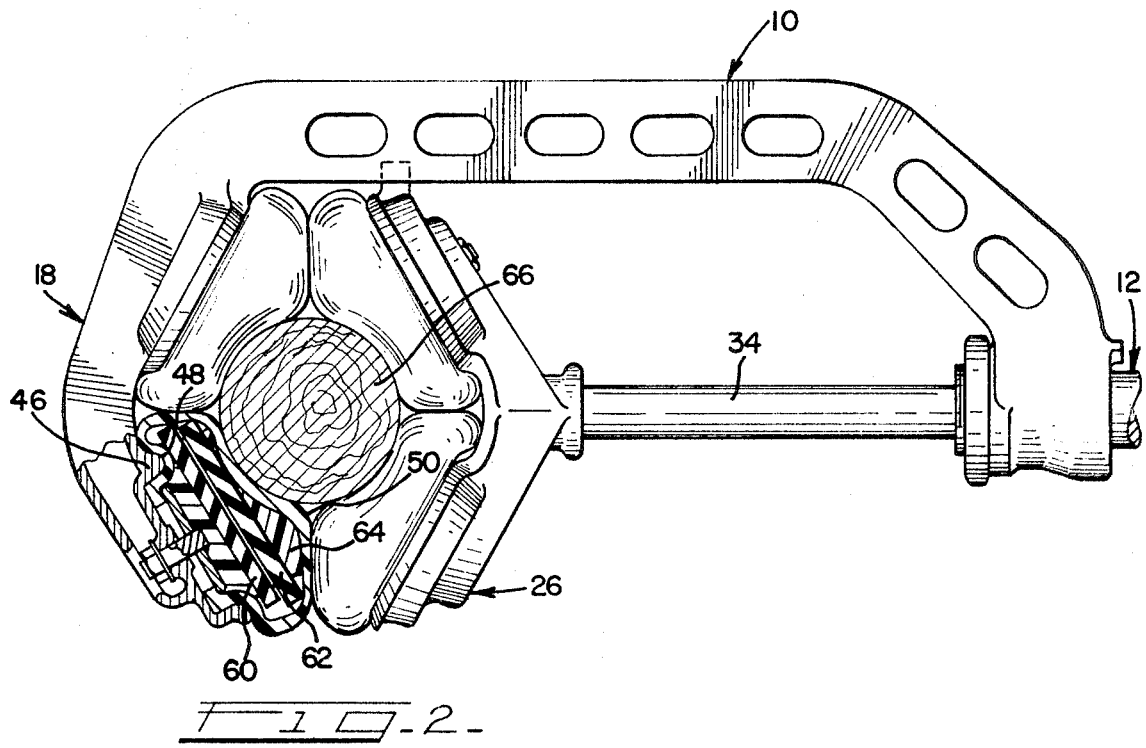

In operation, the boom 12 is oriented so as to position the jaws 18 and 26 on opposite sides of a tree limb (shown at 66 in FIG. 2). The jaw 26 is then extended toward the jaw 18 so that the pods engage the limb 66. The relative angular disposition of the pods tends to center the limb 66 on the longitudinal axis of the boom. As the clamp structure is tightened on the limb 66, the silicone putty 64 is caused to flow and the air tends to be displaced to the outer peripheral portions of the chamber as shown in FIG. 2. The discs 60 and 62 resist deformation of the cap 50 to an extent preventing rupture of the cap. At the same time, the air is compressible so as to accommodate volume changes of the chamber during clamping and thus resist breaking back or sharp folding of the cap. The rounded edge 48 of the rim 46 provides a stop against which the cap 50 may be deformed without sharp bending.

When the boom and clamp structure are rapidly reciprocated to shake the limb, the silicone putty rigidifies since its viscosity increases with the increasing rate of shear to which it is being subjected. This creates a relatively solid and unyielding connection between the clamp structure and the tree limb. Consequently, relative movement between the limb and the clamp is substantially precluded with the result that damage to the tree bark is eliminated. Moreover, the necessary rigidity is provided without the requirement that the flowable and incompressible material completely fill the chamber. On the contrary, the inclusion of the discs and the entrapped air provide the advantage of increased life of the tree-engaging pods.

What I claim is:

1. In a tree clamp structure having opposed jaws for gripping a tree limb therebetween during a tree-shaking operation, wherein the improvement comprises:
   gripping pods mounted on said jaws, each of said pods including a flexible cup-shaped cap secured on a jaw to define an airtight chamber therewith, at least one disc-shaped member floatably disposed within said cap, an incompressible material disposed within said chamber having the properties of flowability under slowly applied forces and rigidity under rapidly applied forces, said material occupying substantially less than the volume of the chamber unoccupied by said disc-shaped member, the remainder of the volume of said chamber not occupied by said disc-shaped member and said material being filled with air.

2. The subject matter of claim 1, wherein the air within the chamber occupies between 12 percent and 26 percent of the total volume of the chamber.

3. The subject matter of claim 1, wherein said disc-shaped member has a diameter substantially the same as the maximum internal diameter of said cap.

4. The subject matter of claim 1, wherein said material is a silicone putty.

5. The subject matter of claim 1, wherein said disc-shaped member is a tire carcass disc.

6. The subject matter of claim 2, wherein said disc-shaped member has a diameter substantially the same as the maximum internal diameter of said cap.

7. The subject matter of claim 6, wherein said material is a silicone putty.

8. The subject matter of claim 7, wherein said disc-shaped member is a tire carcass disc.

9. A tree clamp structure adapted for mounting on an end of a boom for gripping the limb of a tree to be harvested, said clamp structure comprising:
   a fixed jaw rigidly secured to said boom and having a first pair of angularly disposed portions extending transversely of the longitudinal axis of said boom, said portions being joined at an apex disposed in alignment with said axis;
   a movable jaw extendably connected to said boom and having a second pair of angularly disposed portions extending transversely of the longitudinal axis of said boom, said second pair of portions being joined at an apex disposed in alignment with said axis; and
   a pair of tree-engageable pods mounted on each of said pairs of angularly disposed portions, each pod being mounted on a respective one of said portions whereby said pods are angularly disposed in opposable relationship to grip a tree therebetween, each of said pods including a flexible cup-shaped cap secured on its respective portion to define an airtight chamber therewith, at least one disc-shaped member floatably disposed within said cap, an incompressible material disposed within said chamber having the properties of flowability under slowly applied forces and rigidity under rapidly applied forces, said material occupying substantially less than the volume of the chamber unoccupied by said disc-shaped member, the remainder of the volume of said chamber unoccupied by said disc-shaped member and said material being filled with air.

10. The subject matter of claim 9, wherein said disc-shaped member has a diameter substantially the same as the maximum internal diameter of said cap.

11. In a tree clamp structure having opposed jaws with gripping pods thereon for gripping a tree limb therebetween during a tree-shaking operation, wherein the improvement comprises:

each of said jaws including an annular seat defined by a raised circular rim rounded in cross section, each of said pods including a flexible cap having a circular base portion received in a respective one of said annular seats to define an airtight chamber therewith, said cap including a portion of a diameter greater than the diameter of said rim and spaced from said rim whereby portions of said cap are engageable with said rounded in cross section rim to prevent sharp bending or creasing of said cap to accommodate flexing and rolling of said cap relative to said seat during clamping.

12. The subject matter of claim 11, wherein at least one disc-shaped member is floatably disposed within said cap to resist crushing of said cap during deformation.

13. The subject matter of claim 12, including an incompressible material disposed within said chamber having the properties of flowability under slowly applied forces and rigidity under rapidly applied forces.